(12) United States Patent
Bishop

(10) Patent No.: US 7,281,444 B1
(45) Date of Patent: Oct. 16, 2007

(54) RACK AND PINION GEAR YOKE ASSEMBLY

(75) Inventor: Phillip A. Bishop, Kingsport, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 614 days.

(21) Appl. No.: 10/729,087

(22) Filed: Dec. 5, 2003

(51) Int. Cl.
*F16H 35/00* (2006.01)

(52) U.S. Cl. .................... 74/388 PS; 74/89.11; 74/422

(58) Field of Classification Search .................. 74/409, 74/440, 422, 89.11, 89.2, 425, 492, 493, 388 PS
See application file for complete search history.

(56) References Cited

U.S. PATENT DOCUMENTS

| | | | | |
|---|---|---|---|---|
| 3,680,443 A | * | 8/1972 | Jenvey | 91/375 A |
| 4,709,593 A | * | 12/1987 | Takeuchi | 74/498 |
| 4,939,947 A | * | 7/1990 | Toyoshima et al. | 74/422 |
| 5,058,448 A | * | 10/1991 | Kiyooka et al. | 74/422 |
| 5,906,138 A | | 5/1999 | Kostrzewa | |
| 5,931,046 A | * | 8/1999 | Phillips | 74/422 |
| 5,983,742 A | * | 11/1999 | Morris et al. | 74/422 |
| 6,119,540 A | * | 9/2000 | Phillips | 74/422 |
| 6,142,031 A | * | 11/2000 | Phillips | 74/422 |
| 6,390,230 B1 | * | 5/2002 | Shimizu et al. | 180/444 |
| 6,467,366 B1 | | 10/2002 | Gierc | |
| 6,591,706 B2 | * | 7/2003 | Harer et al. | 74/422 |
| 6,595,532 B2 | * | 7/2003 | Tanaka | 280/93.515 |
| 6,619,420 B1 | | 9/2003 | Saarinen | |

\* cited by examiner

*Primary Examiner*—Thomas R. Hannon
*Assistant Examiner*—Matthew A. Johnson
(74) *Attorney, Agent, or Firm*—MacMillan, Sobanski & Todd, LLC

(57) ABSTRACT

This invention relates to a yoke assembly (156) adapted for use in a rack and pinion steering gear assembly (10) for a vehicle. The yoke assembly (156) includes a yoke housing (302) having a bore (304). The bore (304) defines an inner surface (307). A bearing (320) is disposed in the bore (304), the bearing (320) defining an outer surface (322). A ring (324) is also disposed in the bore (304). The ring (324) includes an inner contact surface (334, 336) and an outer contact surface (338). The inner contact surface (334, 336) engages at least a portion of the inner surface (307) of the bore (304) and the outer contact surface (338) engages at least a portion of the outer surface (322) of the bearing (320).

20 Claims, 6 Drawing Sheets

RACK AND PINION GEAR YOKE ASSEMBLY

BACKGROUND OF THE INVENTION

This invention relates in general to rack and pinion steering gears and in particular to an improved yoke assembly for use with such a rack and pinion steering gear.

A known rack and pinion steering gear includes a pinion gear that is rotatably mounted in a housing and is connectable with a steering wheel of a vehicle. A rack bar extends through the housing and has opposite end portions that are connectable with steerable vehicle wheels. The rack bar moves longitudinally relative to the housing for turning the steerable wheels of the vehicle. Gear teeth formed on the rack bar are disposed in meshing engagement with gear teeth on the pinion gear. A yoke assembly is disposed in the housing to support and guide movement of the rack bar relative to the housing. The yoke assembly includes a yoke bearing having an arcuate surface across which the rack bar moves. A spring biases the yoke bearing against the rack bar.

The yoke bearing must be precisely positioned within a bore of the housing. Typically, the yoke bearing is disposed within a machined bore in the housing. The diameter of such a bore must be precisely machined with a very small dimensional tolerance to ensure proper positioning of the yoke assembly. Such machining adds undesirable cost to the housing. Thus, it would be desirable to provide an improved structure for a housing and a yoke assembly which is simple and inexpensive.

SUMMARY OF THE INVENTION

The present invention relates to a yoke assembly adapted for use in a rack and pinion steering gear assembly for a vehicle. The yoke assembly includes a yoke housing having a bore. The bore defines an inner surface. A bearing is disposed in the bore, the bearing defining an outer surface. A ring is also disposed in the bore. The ring includes an inner contact surface and an outer contact surface. The inner contact surface engages at least a portion of the inner surface of the bore and the outer contact surface engages at least a portion of the outer surface of the bearing.

Other advantages of this invention will become apparent to those skilled in the art from the following detailed description of the invention, when read in light of the accompanying drawings.

DETAILED DESCRIPTION OF THE INVENTION

Figure 1:
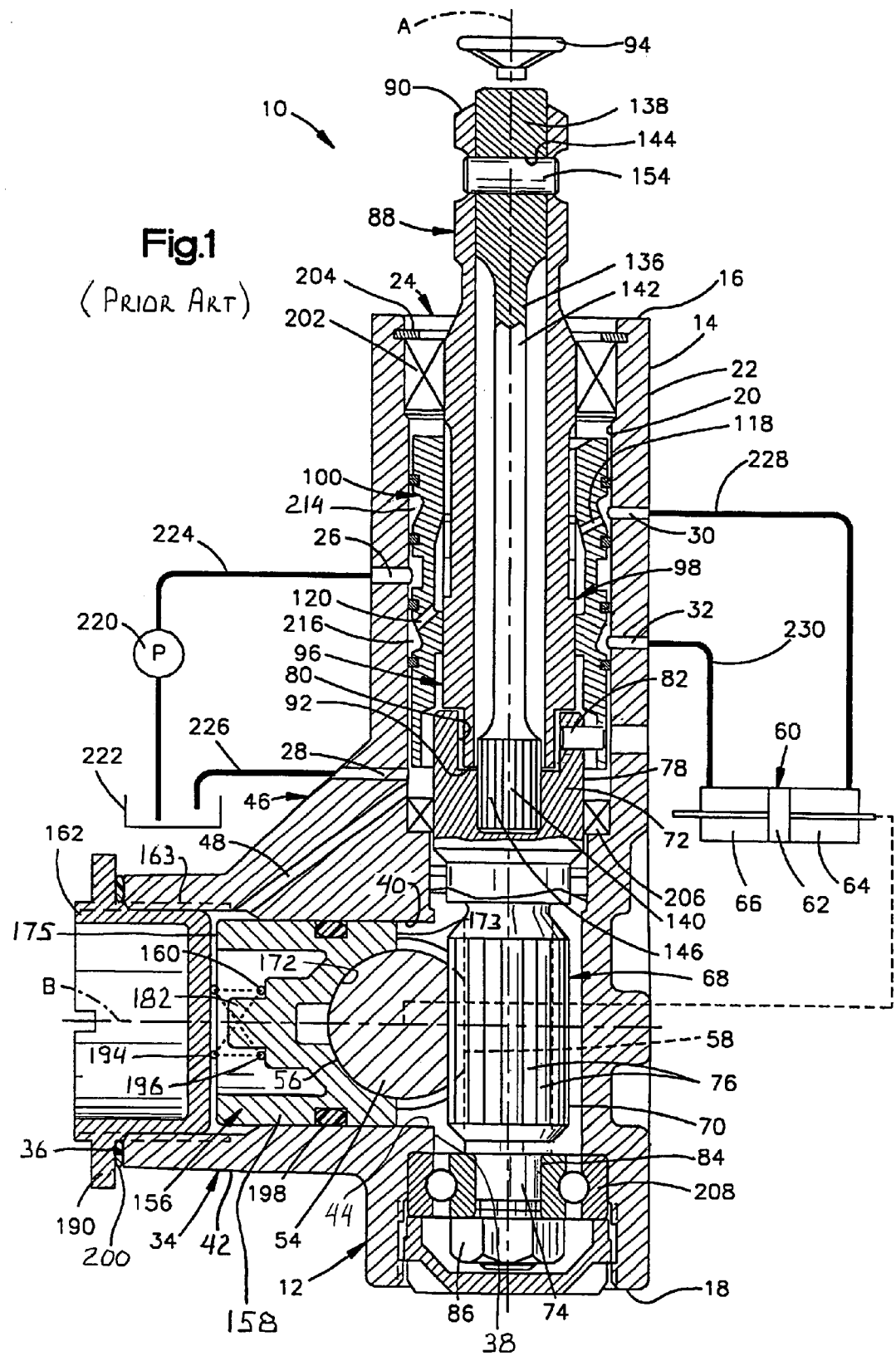
FIG. 1 is a sectional view of a prior art rack and pinion steering gear.

Referring to FIG. 1, there is illustrated a prior art rack and pinion steering gear, indicated generally at 10. The general structure and operation of the rack and pinion steering gear 10 is conventional in the art. Thus, only those portions of the steering gear 10 which are necessary for a full understanding of this invention will be explained and illustrated in detail. Also, although this invention will be described and illustrated in connection with the particular rack and pinion steering gear 10 disclosed herein, it will be appreciated that this invention may be used in connection with other types of rack and pinion steering gears. For example, the portions of the rack and pinion steering gear which define the present invention can be used with any of the rack and pinion steering gears shown in U.S. Pat. No. 6,619,420 to Saarinen, U.S. Pat. No. 6,591,706 to Harer et al., and U.S. Pat. No. 6,467,366 to Gierc, the disclosures of each of these patents incorporated herein by reference.

The rack and pinion steering gear 10 includes a housing 12. The housing 12 has a first tubular portion 14 that extends along an axis A. The first tubular portion 14 has first and second axial ends 16 and 18, respectively, and cylindrical inner and outer surfaces 20 and 22, respectively. The inner surface 20 of the first tubular portion 14 of the housing 12 defines a pinion chamber or passage 24 that extends through the first tubular portion 14. Four radially extending openings extend from the inner surface 20 to the outer surface 22 of the first tubular portion 14. The openings include a fluid inlet opening 26, a fluid outlet opening 28, and first and second motor openings 30 and 32, respectively.

The housing 12 also includes a second tubular portion or yoke housing 34. The yoke housing 34 extends perpendicular to the first tubular portion 14 along an axis B. As shown in prior art FIG. 1, the yoke housing 34 has first and second ends 36 and 38, respectively, an inner surface 40 and an outer surface 42. The second end 38 of the yoke housing 34 unites with the first tubular portion 14 near the second axial end 18 of the first tubular portion 14. The inner surface 40 of the yoke housing 34 defines a yoke chamber or yoke bore 44. The yoke bore 44 mates with the passage 24 of the first tubular portion 14 near the second axial end 18 of the first tubular portion 14. The yoke bore 44 is preferably provided with a threaded portion adjacent the first end 36.

A thickened wall portion 46 of the housing 12 is formed where the first tubular portion 14 mates with the yoke housing 34. The thickened wall portion 46 is located between the fluid outlet opening 28 of the first tubular portion 14 and the yoke housing 34 of the housing 12. A fluid passage 48 extends through the thickened wall portion 46 and connects the passage 24 of the first tubular portion 14 to the yoke bore 44 of the yoke housing 34. Preferably, the fluid passage 48 is cast into the thickened wall portion 46 of the housing 12. The fluid passage 48 fluidly connects the passage 24 and the yoke bore 44.

A longitudinally extending rack bar 54 extends through the housing 12 in a direction that is perpendicular to both axis A and axis B. The rack bar 54 has a generally circular cross-sectional shape that is defined by a generally cylindrical outer surface 56. An upper surface 58 of the rack bar 54 includes a plurality of teeth (not shown). Opposite end portions (not shown) of the rack bar 54 are connectable with steerable wheels (not shown) of a vehicle (not shown). Movement of the rack bar 54 in a longitudinal direction relative to the housing 12 results in the turning of the steerable wheels of the vehicle.

A hydraulic motor 60, shown schematically in FIG. 1, is also formed in the housing 12. The hydraulic motor 60 includes a piston 62, which is attached to the rack bar 54. The piston 62 separates two variable volume chambers 64 and 66, respectively. One chamber 64 or 66 is located on each side of the piston 62. The hydraulic motor 60 is actuated when a differential pressure arises between the two chambers 64 and 66. The hydraulic motor 60 discontinues operation when the pressure between the two chambers 64 and 66 equalizes. When the hydraulic motor 60 is actuated, fluid pressure moves the piston 62. Movement of the piston 62 results in movement of the rack bar 54 in the longitudinal direction relative to the housing 12.

As shown in prior art FIG. 1, a pinion gear 68 includes a gear portion 70, a first support portion 72, and a second support portion 74. The gear portion 70 has a plurality of teeth 76 for meshingly engaging the teeth of the rack bar 54. The first support portion 72 of the pinion gear 68 forms a first axial end of the pinion gear 68. The first support portion 72 includes a cylindrical outer surface 78. An axially extending cavity 80 extends into the first support portion 72. A hole, shown generally at 82, extends radially through the first support portion 72 and terminates at the cavity 80.

The second support portion 74 of the pinion gear 68 forms a second axial end of the pinion gear 68. The second support portion 74 has a cylindrical outer surface 84. The diameter of the second support portion 74 of the pinion gear 68 is less than the diameter of the first support portion 72. An end of the cylindrical outer surface 84 of the second support portion 74, opposite the gear portion 70, is threaded for receiving a pinion nut 86.

An input shaft 88 includes first and second axial ends 90 and 92, respectively. The first axial end 90 of the input shaft 88 is connectable with a steering wheel 94 of the vehicle. The second axial end 92 of the input shaft 88 includes a valve core part 96.

The prior art rack and pinion steering gear 10 also includes a valve assembly, shown generally at 98. The valve assembly 98 includes a valve sleeve part 100 and the valve core part 96. The valve sleeve part 100 of the valve assembly 98 of the rack and pinion steering gear 10 is tubular.

A first set of passages 118 extends radially outwardly through the valve sleeve part 100. The first set of passages includes three passages 118, only one of which is shown in prior art FIG. 1. A second set of passages 120 extends radially outwardly through the valve sleeve part 100. The second set of passages 120 includes three passages 120, only one of which is shown in prior art FIG. 1.

A torsion bar 136 includes first and second axial end portions 138 and 140, respectively, and an intermediate portion 142. The first axial end portion 138 is cylindrical. A radially extending hole 144 extends through the first axial end portion 138. The second axial end portion 140 is also generally cylindrical and includes a splined outer surface 146. The first axial end portion 138 of the torsion bar 136 is then fixed to the input shaft 88 using a pin 154.

The prior art rack and pinion steering gear 10 also includes a yoke assembly 156. As shown in prior art FIG. 1, the yoke assembly 156 includes a yoke bearing 158, a spring 160, and a yoke plug 162.

The yoke bearing 158 is generally cylindrical in shape and includes a cylindrical outer side wall 164. A recess 172 extends into a first end surface 173 of the yoke bearing 158. The recess 172 is defined by an arcuate shaped recess surface. Preferably, the arc of the arcuate shaped recess surface is partially cylindrical with a radius that is equal to a radius of the outer surface 56 of the rack bar 54. A cylindrical spring guide 182 extends outwardly from a second end surface 175 of the yoke bearing 158. The spring guide 182 is centered on the axis B.

The spring 160 of the yoke assembly 156 illustrated in prior art FIG. 1 is a helical compression spring. The spring 160 has a first axial end 194 and an opposite second axial end 196. The spring 160 also has a known spring constant. The yoke plug 162 is preferably cup-shaped and includes a threaded outer surface 163, and an outwardly extending annular flange 190.

The yoke assembly 156 also includes two fluid-tight seals 198 and 200. The seals 198 and 200 are preferably O-rings. The first seal 198 is designed to seal between the cylindrical outer side wall 164 of the yoke bearing 158 and the yoke bore 44 of the yoke housing 34 of the housing 12. The second seal 200 is designed to seal between the flange 190 of the yoke plug 162 and the first end 36 of the yoke housing 34 of the housing 12. The first seal 198 also reduces noise, vibration, and harshness (NVH) between the yoke bearing 158 and the yoke bore 44.

As shown in prior art FIG. 1, the rack and pinion steering gear 10 includes three bearing assemblies. A first bearing assembly 202 is located adjacent the opening at the first axial end 16 of the first tubular portion 14 of the housing 12. The first bearing assembly 202 extends between the housing 12 and the input shaft 88 and enables rotation of the input shaft 88 relative to the housing 12. A retaining ring 204 holds the first bearing assembly 202 in the first tubular portion 14 of the housing 12.

A second bearing assembly 206 is located in the passage 24 of the first tubular portion 14 between the fluid outlet opening 28 and the yoke bore 44. The second bearing assembly 206 extends between the housing 12 and the first support portion 72 of the pinion gear 68 and enables rotation of the pinion gear 68 relative to the housing 12.

A third bearing assembly 208 is located in the passage 24 of the first tubular portion 14 between the yoke bore 44 and the second axial end 18 of the first tubular portion 14. The third bearing assembly 208 extends between the housing 12 and the second support portion 74 of the pinion gear 68 and enables rotation of the pinion gear 68 relative to the housing 12. The third bearing assembly 208 is held in the housing 12 and relative to the pinion gear 68 by the pinion nut 86 that is screwed onto the threads of the second support portion 74.

As shown in prior art FIG. 1, a pump 220 draws hydraulic fluid from a reservoir 222 and supplies the hydraulic fluid to the rack and pinion steering gear 10. A conduit 224 extends between pump 220 and the fluid inlet opening 26 of the housing 12 for carrying fluid from the pump 220 to the rack and pinion steering gear 10. A conduit 226 extends from the fluid outlet opening 28 of housing 12 to the reservoir 222 for returning hydraulic fluid to the reservoir 222. The rack and pinion steering gear 10 also includes a conduit 228 that extends from the first motor opening 30 to the chamber 64 of the hydraulic motor 60 and a conduit 230 that extends from the second motor opening 32 to the chamber 66. As shown in prior art FIG. 1, conduit 228 provides fluid communication between a first annular motor channel 214 and the chamber 64 of the hydraulic motor 60. Conduit 230 provides fluid communication between a second annular motor channel 216 and the chamber 66 of the hydraulic motor 60. Fluid flow through the conduits 228 and 230 is bi-directional. Thus, when the volume of chamber 64 of the hydraulic motor 60 is increasing, fluid flows through the conduit 228 toward the hydraulic motor and through conduit 230 away from the hydraulic motor 60. When the volume of chamber 64 of the hydraulic motor 60 is decreasing, fluid flows through conduit 230 toward the hydraulic motor 60 and through conduit 228 away from the hydraulic motor 60.

When the prior art rack and pinion steering gear 10 is mounted in a vehicle, the input shaft 88 is operatively coupled to the steering wheel 94 of the vehicle. Rotation of the steering wheel 94 results in rotation of the input shaft 88. Since the input shaft 88 is fixed relative to the first axial end portion 138 of the torsion bar 136, rotation of the input shaft 88 results in rotation of the first axial end portion 138 of the torsion bar. If resistance to the turning of the steerable wheels of the vehicle is above a threshold level, the second axial end portion 140 of the torsion bar 136 will not be rotated by rotation of the first axial end portion 138 of the torsion bar. As a result, rotation of the first axial end portion 138 of the torsion bar 136 relative to the second axial end portion 140 will cause torsion or twisting of the intermediate portion 142 of the torsion bar. Torsion of the intermediate portion 142 of the torsion bar 136 causes the valve core part 96 to move relative to the valve sleeve part 100. The construction of the prior art rack and pinion steering gear 10 thus far described is conventional in the art.

Figure 2:
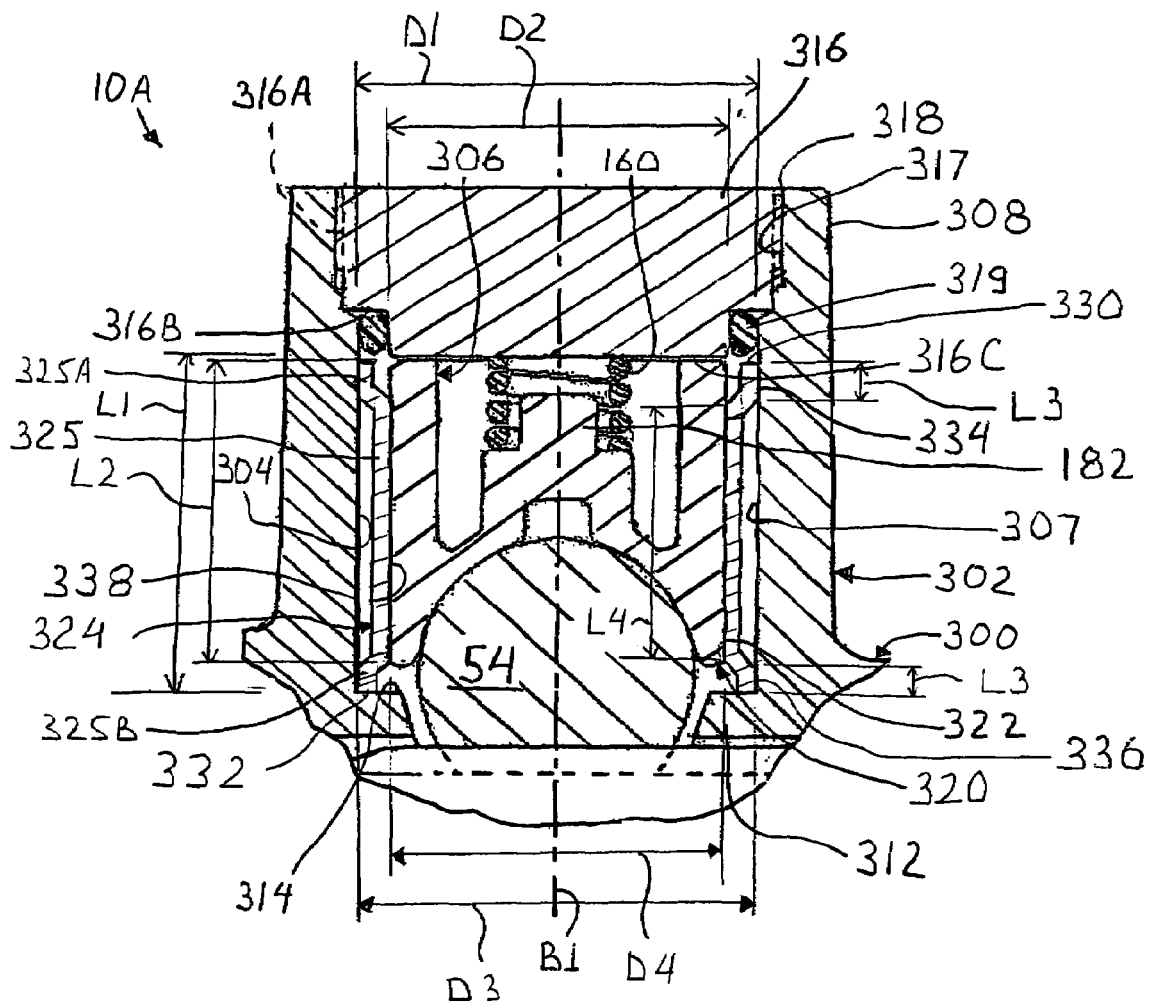
FIG. 2 is an enlarged sectional view of a portion a rack and pinion steering gear including a first embodiment of a yoke bearing tolerance ring constructed in accordance with the present invention.

Referring now to FIG. 2 and using like reference numbers to indicate corresponding parts, there is illustrated a portion of a steering gear, indicated generally at 10A, including a first embodiment of a yoke assembly 306 according to the present invention. The steering gear 10A includes a housing 300 having a yoke housing or portion 302. The yoke portion 302 defines an axis BI and includes a yoke bore 304. Preferably, the housing 300 is cast from a suitable materials, such as for example, steel or aluminum, and the yoke bore 304 is formed during the casting process. As will be described herein, the yoke bore 304 generally requires no machining subsequent to being cast, although slight machining or other finishing may be done depending upon the quality of the casting and/or the particular application.

As shown in this embodiment, the yoke assembly 306 is shown disposed in the yoke portion 302 of the housing 300. However, it will be understood that the yoke assembly 306 can be used with any desired yoke portion, such as for example, with the yoke housing 34 shown in prior art FIG. 1.

The yoke portion 302 is substantially cylindrical and includes an inner surface 307 and an outer surface 308. The inner surface 307 of the yoke portion 302 defines the yoke bore 304. A flange 312 extends inwardly from the yoke bore 304 and includes a flange inner surface 314. The flange surface 314 defines an inner end of the yoke bore 304. The yoke bore 304 defines a first diameter D1 and a first axial length L1. The first axial length L1 of the yoke bore 304 is defined as the distance between the flange inner surface 314 and an inner surface of a yoke cover or plug 316, described below. The yoke bore 304 is preferably provided with a threaded portion 317 adjacent an outer or opened end 318 thereof. Alternatively, the structure of the yoke bore 304 can be other than illustrated if so desired. For example, it will be appreciated that the yoke bore 304 can be formed without the flange 312 if so desired.

The yoke plug 316 is substantially cylindrical and includes a threaded outer surface 316A. A circumferentially extending seal groove 316B is formed in an inner surface 316C of the yoke plug 316. Alternatively, the structure of the yoke plug 316 can be other than illustrated if so desired. For example, it will be understood that the yoke plug 316 can be of any desired design, such as the yoke plug 162 shown in prior art FIG. 1.

The yoke assembly 306 also includes a fluid-tight seal 319. The seal 318 is preferably an O-ring. The seal 318 is installed about the seal groove 316B of the yoke plug 316 and is designed to provide a seal between the yoke plug 316 and the yoke bore 304.

The yoke assembly 306 further includes a yoke bearing 320. The yoke bearing 320 is substantially identical to the yoke bearing 158 except that the yoke bearing 320 does not include a recess for the seal 198 for reasons that will be explained herein. The yoke bearing 320 is generally cylindrical in shape and includes a cylindrical outer surface or side wall 322 which defines a bearing surface having a second diameter D2 and a second axial length L2. The second diameter D2 of the yoke bearing 320 is smaller relative to the first diameter D1 of the yoke bore 304 and the second axial length L2 of the yoke bearing 320 is less than the first axial length L1 of the yoke bore 304. As previously described regarding prior art FIG. 1, the spring 160 is disposed about the cylindrical spring guide 182 and normally biases the yoke bearing 320 away from the yoke plug 316 and against the rack bar 54.

A tolerance ring 324 is disposed between the outer side wall 322 of the yoke bearing 320 and the inner surface 307 of the yoke bore 304. The tolerance ring 324 is a hollow, substantially cylindrical or tubular shaped sleeve or tube and includes a main body portion 325, a first increased diameter end 330, and a second increased diameter end 332. The main body portion 325 defines a fourth diameter D4 and the ends define third diameters D3 which are equal to one another and greater than the diameter D4. A first bore engaging member 325A extends circumferentially and outwardly from the body portion 325. The first bore engaging member 325A defines a first inner or bore engaging surface 334 for contacting the yoke bore 304 of the yoke portion 302 of the housing 300. A second bore engaging member 325B extends circumferentially and outwardly from the body portion 325. The second bore engaging member 325B defines a second inner or bore engaging surface 336 for contacting the yoke bore 304. In the illustrated embodiment, the first and second bore engaging surfaces 334 and 336 are identical to each other and define the third diameter D3 and a third axial length L3. The body portion 325 defines an outer or bearing engaging surface 338 for contacting the outer surface 322 of the yoke bearing 320. The bearing engaging surface 338 defines the fourth diameter D4 and a fourth axial length L4. The fourth diameter D4 of the tolerance ring 324 is smaller relative to the third diameter D3 of the tolerance ring 324.

Preferably, the fourth axial length L4 of the bearing engaging surface 338 is substantially equal to the second axial length L2 of the yoke bearing 320, such that substantially the entire bearing engaging surface 338 of the tolerance ring 324 is in contact with the outer side wall 322 of the yoke bearing 320. More preferably, the axial length L4 of the bearing engaging surface 338 of the tolerance ring 324 is within the range of from about 80 percent to about 100 percent of the axial length L2 of the outer side wall 322 of the yoke bearing 320.

The second end 332 of the tolerance ring 324 preferably contacts the flange surface 314, thereby providing a positive stop or engagement surface when installing the tolerance ring 324 into the yoke bore 304.

Preferably, the third diameter D3 of the tolerance ring 324 is slightly larger relative to the first diameter D1 of the yoke bore 304, such that the surfaces 334 and 336 of the tolerance ring 324 frictionally engage the yoke bore 304. As a result, the tolerance ring 324 is retained in the yoke bore 304 by a press-fit or friction-fit therewith.

The tolerance ring 324 can be made by any suitable process from any suitable material. For example, the tolerance ring 324 can formed by mechanical deformation, electromagnetic pulse forming, hydroforming, and the like, and made from any suitable grade of steel, such as stainless steel or carbon steel. Preferably, the tolerance ring 324 is made of spring steel. Alternately, the tolerance ring 324 can be formed from other materials, such as for example, other metals and non-metals. Alternatively, the structure of the tolerance ring 324 can be other than illustrated if so desired.

Figure 3:
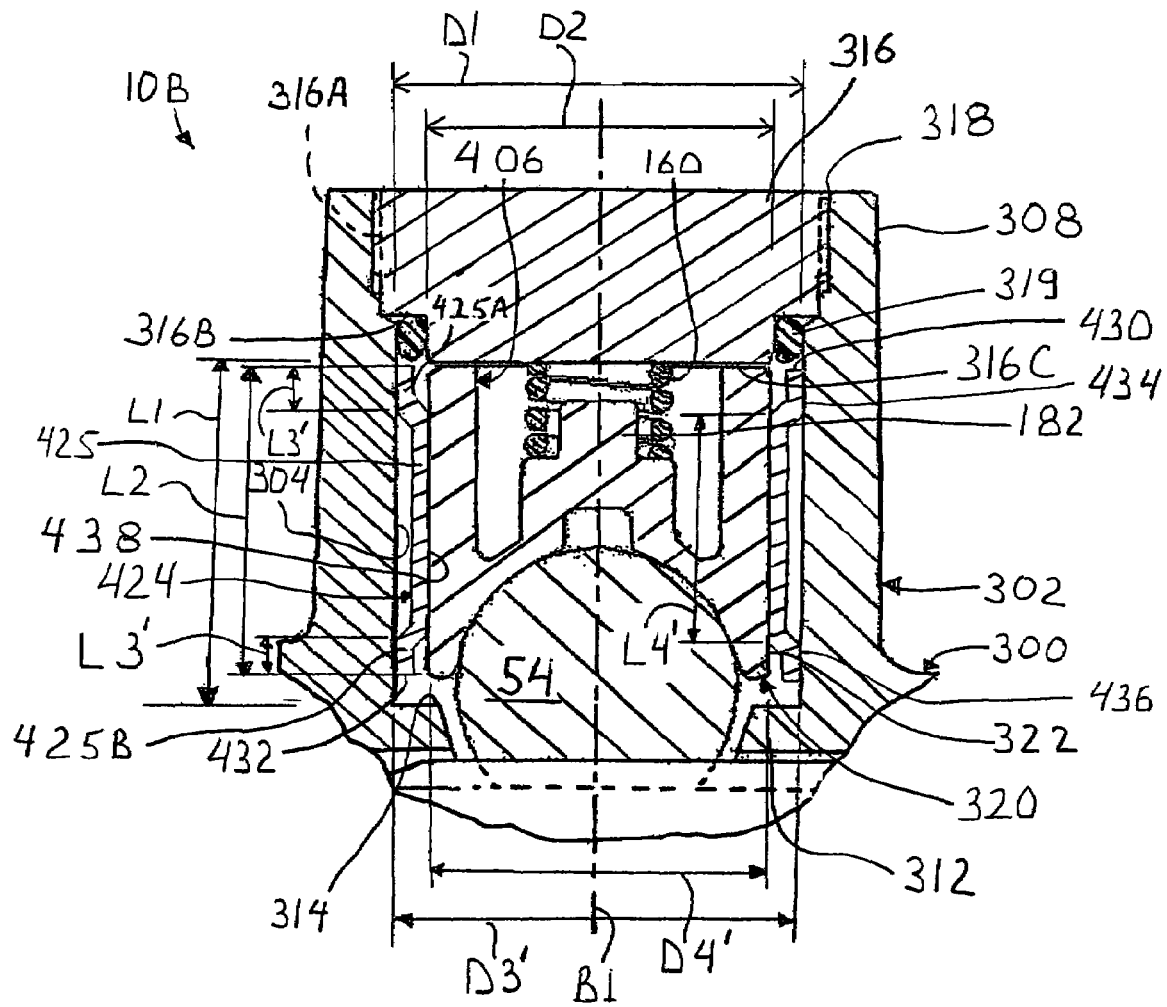
FIG. 3 is an enlarged sectional view of a portion of a rack and pinion steering gear including a second embodiment of a yoke bearing tolerance ring constructed in accordance with the present invention.

Referring now to FIG. 3 and using like reference numbers to indicate corresponding parts, there is illustrated a portion of a steering gear, indicated generally at 10B, including a second embodiment of a yoke assembly 406 and a tolerance ring 424 according to the present invention.

The tolerance ring 424 is disposed between the outer side wall 322 of the yoke bearing 320 and the inner surface 307 of the yoke bore 304. The tolerance ring 424 is a hollow, substantially cylindrical or tubular shaped sleeve or tube and includes a main body portion 425, a first increased diameter end 430, and a second increased diameter end 432. The main body portion 425 defines a fourth diameter D4' and the ends define third diameters D3' which are equal to one another and greater than the diameter D4'. A first bore engaging member 425A extends circumferentially and outwardly from the main body portion 425. The first bore engaging member 425A defines a first bore engaging surface 434 for contacting the yoke bore 304 of the yoke portion 302 of the housing 300. A second bore engaging member 425B extends circumferentially and outwardly from the main body portion 425. The second bore engaging member 425B defines a second bore engaging surface 436 for contacting the yoke bore 304. In the illustrated embodiment, the first and second bore engaging surfaces 434 and 436 are identical to each other and define the third diameter D3' and a third axial length L3'. The body portion 425 defines a bearing engaging surface 438 for contacting the outer surface 322 of the yoke bearing 320. The bearing engaging surface 438 has the fourth diameter D4' and a fourth axial length L4'. The fourth diameter D4' of the tolerance ring 424 is smaller relative to the third diameter D3' of the tolerance ring 424.

As shown in FIG. 3, the fourth axial length L4' of the bearing engaging surface 438 is shorter than the second axial length L2 of the yoke bearing 320. As illustrated, the bearing engagement surface 438 is longitudinally centered on the side wall 322, such that the second end 432 is spaced from the flange 312. However, it will be appreciated that such centering is not required and tolerance ring 424 can be positioned within the yoke bore 304 such that the second end 432 is positioned at any desired distance from the flange 312 so long as the bearing engaging surface 438 engages the side wall 322. Although the second end 432 need not contact the flange 312, the axial length L4' of the tolerance ring 424 is preferably within the range of from about 80 percent to about 100 percent of the axial length L2 of the side wall 322.

Preferably, the third diameter D3' of the tolerance ring 424 is slightly larger relative to the first diameter D1 of the yoke bore 304, such that the surfaces 434 and 436 frictionally engage the yoke bore 304.

The tolerance ring 424 can be made by any suitable process from any suitable material. For example, the tolerance ring 424 can formed by mechanical deformation, electromagnetic pulse forming, hydroforming, and the like, and made from any suitable grade of steel, such as stainless steel or carbon steel. Preferably, the tolerance ring 424 is made of spring steel. Alternately, the tolerance ring 424 can be formed from other materials, such as for example, other metals and non-metals.

Figure 4:
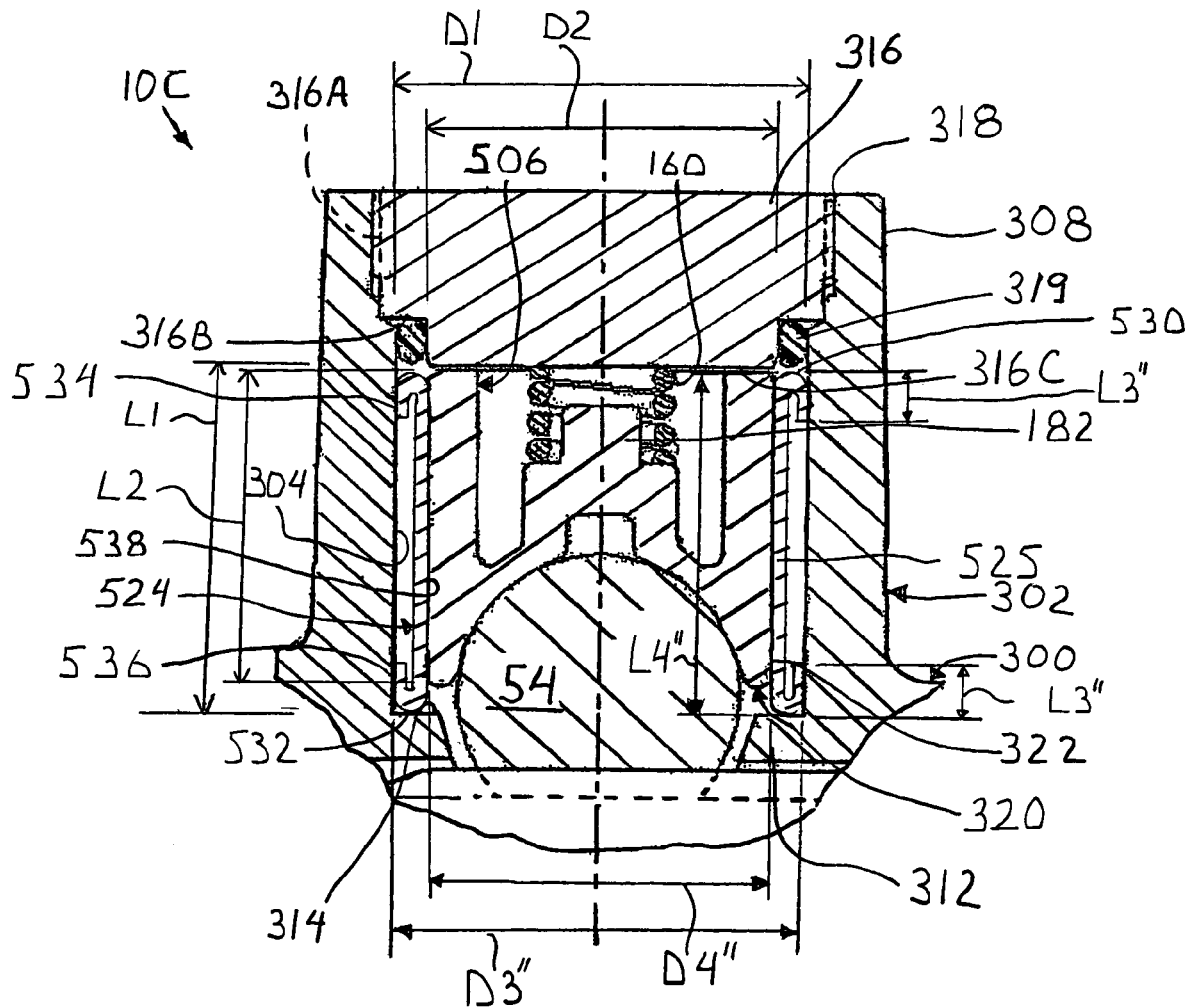
FIG. 4 is an enlarged sectional view of a portion of a rack and pinion steering gear including a third embodiment of a yoke bearing tolerance ring constructed in accordance with the present invention.

Referring now to FIG. 4 and using like reference numbers to indicate corresponding parts, there is illustrated a portion of a steering gear, indicated generally at 10C, including a third embodiment of a yoke assembly 506 and a tolerance ring 524 according to the present invention.

The tolerance ring 524 is disposed between the outer side wall 322 of the yoke bearing 320 and the inner surface 307 of the yoke bore 304. The tolerance ring 524 is a hollow, substantially cylindrical or tubular shaped sleeve or tube and includes a main body portion 525, a first increased diameter end 530, and a second increased diameter end 532. Preferably, the tolerance ring 524 has a C shaped cross section. The body portion 525 of the tolerance ring 524 further defines a bearing engaging surface 538 for contacting the outer surface 322 of the yoke bearing 320, and first and second bore engaging surfaces 534 and 536, respectively, for contacting the yoke bore 304 of the yoke portion 302 of the housing 300. The first and second bore engaging surfaces 534 and 536 define a third diameter D3" and a third axial length L3". The bearing engaging surface 538 defines a fourth diameter D4" and a fourth axial length L4". The fourth diameter D4" of the tolerance ring 524 is smaller relative to the third diameter D3" of the tolerance ring 524.

Preferably, the fourth axial length L4" of the bearing engaging surface 538 is substantially equal to the second axial length L2 of the yoke bearing 320, such that substantially the entire bearing engaging surface 538 is in contact with the side wall 322 of the yoke bearing 320. More preferably, the axial length L4" of the tolerance ring 524 is within the range of from about 80 percent to about 100 percent of the axial length L2 of the side wall 322.

The second end 532 of the tolerance ring 524 preferably contacts the flange surface 314, thereby providing a stop or engagement surface when installing the tolerance ring 524 into the yoke bore 304.

Preferably, the third diameter D3" of the tolerance ring 524 is slightly larger relative to the first diameter D1 of the yoke bore 304, such that the surfaces 534 and 536 frictionally engage the yoke bore 304.

The tolerance ring 524 can be made by any suitable process from any suitable material. For example, the tolerance ring 524 can formed by mechanical deformation, electromagnetic pulse forming, hydroforming, and the like, and made from any suitable grade of steel, such as stainless steel or carbon steel. Preferably, the tolerance ring 524 is made of spring steel. Alternately, the tolerance ring 524 can be formed from other materials, such as for example, other metals and non-metals.

Figure 5:
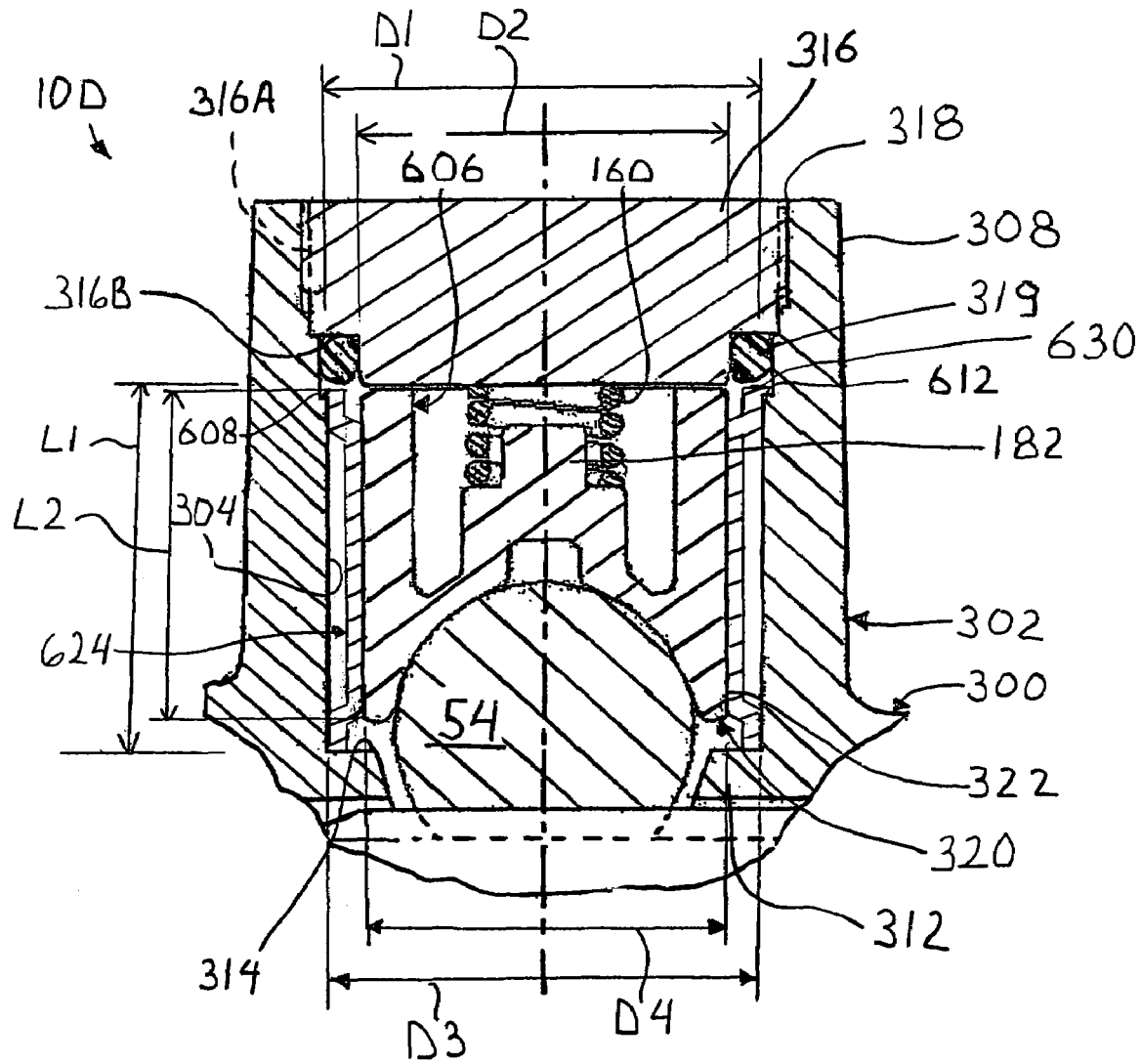
FIG. 5 is an enlarged sectional view of a portion of a rack and pinion steering gear including a fourth embodiment of a yoke bearing tolerance ring constructed in accordance with the present invention.

Referring now to FIG. 5 and using like reference numbers to indicate corresponding parts, there is illustrated a portion of a steering gear, indicated generally at 10D, including a fourth embodiment of a yoke assembly 606 and a tolerance ring 624 according to the present invention. In this embodiment, the tolerance ring 624 is substantially identical to the tolerance ring 324 shown in FIG. 2 except that a first end 630 of the tolerance ring 624 includes an outwardly extending circumferential flange 608. Additionally, in this embodiment, a circumferential groove 610 defining a groove surface 612 is formed in the yoke bore 304 (upper end of the bore 304 as viewed in FIG. 5).

When inserted into the yoke bore 304, the flange 608 of the first end 630 of the tolerance ring 624 preferably contacts the groove surface 612, thereby providing a stop or engagement surface when installing the tolerance ring 624 into the yoke bore 304.

The tolerance ring 624 can be made by any suitable process from any suitable material. For example, the tolerance ring 624 can formed by mechanical deformation, electromagnetic pulse forming, hydroforming, and the like, and made from any suitable grade of steel, such as stainless steel or carbon steel. Preferably, the tolerance ring 624 is made of spring steel. Alternately, the tolerance ring 624 can be formed from other materials, such as for example, other metals and non-metals.

Figure 6:
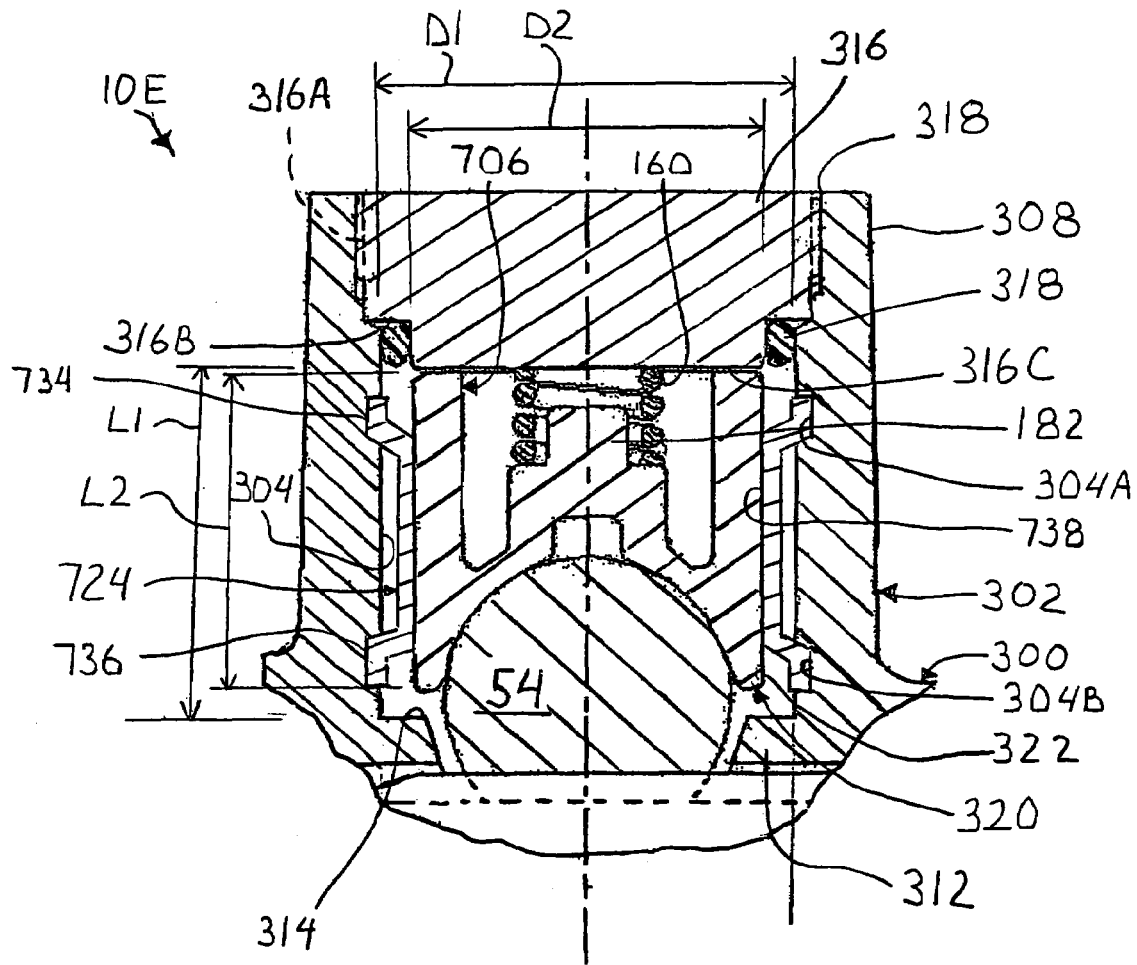
FIG. 6 is an enlarged sectional view of a portion of a rack and pinion steering gear including a fifth embodiment of a yoke bearing tolerance ring constructed in accordance with the present invention.

Referring now to FIG. 6 and using like reference numbers to indicate corresponding parts, there is illustrated a portion of a steering gear, indicated generally at 10E, including a fifth embodiment of a yoke assembly 706 and a tolerance ring 724 according to the present invention. The yoke assembly 706 is substantially identical to the yoke assembly 406 shown in FIG. 3, except that the yoke bore 304 includes a first and second circumferential mounting grooves 304A and 304B, respectively. The yoke assembly 706 includes a tolerance ring 724. The tolerance ring 724 includes a first bore engaging surface 734 and a second bore engaging surface 736. As shown in FIG. 6, the first bore engaging surface 734 is disposed within the first mounting groove 304A and the second bore engaging surface 736 is disposed within the second mounting groove 304B. Preferably, the mounting grooves 304A and 304B are positioned in the yoke bore 304 such that the bearing engaging surface 738 of the tolerance ring 724 contacts within the range of from about 80 percent to about 100 percent of the axial length L2 of the side wall 322.

One advantage of the yoke assembly (306, 406, 506, 606, 706) of the present invention is that use of the tolerance ring (324, 424, 524, 624, 724) allows the yoke bore to be used "as cast" and without any subsequent machining. Because no machining is required, the yoke bore can be cast to a desired final diameter, such as the diameter D2. Known yoke assemblies commonly include yoke bores cast having a diameter smaller than the desired finished diameter. Yoke material is then removed during a subsequent machining operation during which the yoke bore is machined to achieve the desired finished diameter. Therefore, casting the yoke bore to a desired final diameter according to the present invention reduces material, manufacturing and labor costs, and manufacturing time.

Another advantage of the yoke assembly (306, 406, 506, 606, 706) of the present invention is that the tolerance ring (324, 424, 524, 624, 724) can be manufactured to desired dimensional and positional tolerances previously achievable only with post-casting machining of the yoke bore. For example, the tolerance ring (324, 424, 524, 624, 724) can be manufactured to provide a bearing engagement surface (338, 438, 538, 638, 738) having a diametric tolerance of within the range of about +/−0.035 mm. Further, the tolerance ring (324, 424, 524, 624, 724) can be installed within the yoke bore such that the associated yoke bearing (320) can be subsequently installed within the tolerance ring (324, 424, 524, 624, 724) to provide a yoke bearing positional tolerance within the range of about +/−0.50 mm, thereby substantially eliminating the occurrence of side loading or off-center installation of the associated yoke bearing.

Further, because the tolerance ring (324, 424, 524, 624, 724) provides for such precise positioning of the yoke bearing 320, undesirable noise, vibration and harshness (NVH) is also significantly reduced. Because NVH is reduced, the need for an O-ring, such as the O-ring 198 illustrated in prior art FIG. 1, is thereby eliminated. However, it will be appreciated that such an O-ring can be provided about the body of the tolerance ring (324, 424, 524, 624, 724) if so desired.

In accordance with the provisions of the patent statues, the principle and mode of operation of this invention have been described and illustrated in its preferred embodiment. However, it must be understood that the invention may be practiced otherwise than as specifically explained and illustrated without departing from the scope or spirit of the attached claims.

What is claimed is:

1. A yoke assembly adapted for use in a rack and pinion steering gear assembly for a vehicle comprising:
    a yoke housing having a bore, said bore defining an inner surface;
    a bearing disposed in said bore, said bearing defining an outer surface;
    a ring disposed in said bore, said ring including a generally cylindrical body having a longitudinal axis, said cylindrical body having a first longitudinal end and a second longitudinal end, an outer surface of said body portion having a first diameter, and an outer surface of said first and second longitudinal ends defining an inner contact surface and having a second diameter greater than said first diameter, said ring further including an outer contact surface, said inner contact surfaces of said first and second longitudinal ends engaging at least a portion of said inner surface of said bore and said outer contact surface engaging at least a portion of said outer surface of said bearing.

2. The yoke assembly according to claim 1 and further including a cover attached to said yoke housing, a spring carried by the yoke assembly and a seal disposed between said cover and said yoke housing.

3. The yoke assembly according to claim 1 wherein said bore is an as cast bore.

4. The yoke assembly according to claim 1 wherein said outer contact surface of said ring engages said outer surface of said bearing along a portion of an entire length thereof.

5. The yoke assembly according to claim 1 wherein said inner contact surface engages selected spaced apart portions of said inner surface of said bore and said outer contact surface engages a portion of said outer surface of said bearing.

6. The yoke assembly according to claim 1 wherein said ring is disposed in said bore in a press fit engagement therewith.

7. The yoke assembly according to claim 1 wherein said bore includes at least one surface feature for engaging a portion of said ring to thereby retain said ring in a predetermined position within said bore.

8. The yoke assembly according to claim 1 wherein said bore includes at least one groove formed therein for receiving a portion of said ring to thereby retain said ring in a predetermined position within said bore.

9. The yoke assembly according to claim 1 wherein said ring is formed from metal.

10. A yoke assembly adapted for use in a rack and pinion steering gear assembly for a vehicle comprising:
    a yoke housing having an as cast bore, said bore defining an inner surface;
    a bearing disposed in said bore, said bearing defining an outer surface;
    a ring disposed in said bore, said ring including a generally cylindrical body having a longitudinal axis, said cylindrical body having a first longitudinal end and a second longitudinal end, an outer surface of said body portion having a first diameter, and an outer surface of said first and second longitudinal ends defining an inner contact surface and having a second diameter greater than said first diameter, said ring further including an outer contact surface, said inner contact surfaces of said first and second longitudinal ends engaging at least a portion of said inner surface of said bore and said outer contact surface engaging at least a portion of said outer surface of said bearing;

a cover attached to said yoke housing;

a spring carried by the yoke assembly; and a seal disposed between said cover and said yoke housing.

11. The yoke assembly according to claim 10 wherein said ring is formed from metal.

12. A rack and pinion steering gear assembly for a vehicle comprising:

a housing having a pinion chamber and a bearing chamber, said bearing chamber having a bore, said bore defining an inner surface;

an axially moveable rack supported in said bearing chamber;

a pinion supported in said pinion chamber and adapted to be in meshing engagement with said rack;

a bearing disposed in said bore for supporting said rack, said bearing defining an outer surface; and a ring disposed in said bore, said ring including a generally cylindrical body having a longitudinal axis, said cylindrical body having a first longitudinal end and a second longitudinal end, an outer surface of said body portion having a first diameter, and an outer surface of said first and second longitudinal ends defining an inner contact surface and having a second diameter greater than said first diameter, said ring further including an outer contact surface, said inner contact surfaces of said first and second longitudinal ends engaging at least a portion of said inner surface of said bore and said outer contact surface engaging at least a portion of said outer surface of said bearing.

13. The rack and pinion steering gear assembly according to claim 12 and further including a cover attached to said housing, a spring carried by said bearing, and a seal disposed in said bearing chamber.

14. The rack and pinion steering gear assembly according to claim 12 wherein said bore is an as cast bore.

15. The rack and pinion steering gear assembly according to claim 12 wherein said outer contact surface of said ring engages said outer surface of said bearing along a portion of an entire length thereof.

16. The rack and pinion steering gear assembly according to claim 12 wherein said inner contact surface engages selected spaced apart portions of said inner surface of said bore and said outer contact surface engages a portion of said outer surface of said bearing.

17. The rack and pinion steering gear assembly according to claim 12 wherein said ring is disposed in said bore in a press fit engagement therewith.

18. The rack and pinion steering gear assembly according to claim 12 wherein said bore includes at least one surface feature for engaging a portion of said ring to thereby retain said ring in a predetermined position within said bore.

19. The rack and pinion steering gear assembly according to claim 12 wherein said bore includes at least one groove formed therein for receiving a portion of said ring to thereby retain said ring in a predetermined position within said bore.

20. The rack and pinion steering gear assembly according to claim 12 wherein said ring is formed from metal.

* * * * *